(12) United States Patent
Cao

(10) Patent No.: US 10,989,963 B1
(45) Date of Patent: Apr. 27, 2021

(54) DISPLAY PANEL

(71) Applicant: Shenzhen China Star Optoelectronics Semiconductor Display Technology Co., Ltd., Guangdong (CN)

(72) Inventor: Wu Cao, Guangdong (CN)

(73) Assignee: Shenzhen China Star Optoelectronics Semiconductor Display Technology Co., Ltd., Guangdong (CN)

( * ) Notice: Subject to any disclaimer, the term of this patent is extended or adjusted under 35 U.S.C. 154(b) by 0 days.

(21) Appl. No.: 16/639,757

(22) PCT Filed: Dec. 27, 2019

(86) PCT No.: PCT/CN2019/129216
§ 371 (c)(1),
(2) Date: Feb. 18, 2020

(30) Foreign Application Priority Data

Dec. 17, 2019 (CN) .......................... 201911297478.4

(51) Int. Cl.
*G02F 1/1343* (2006.01)
*G02F 1/1337* (2006.01)
*G02F 1/137* (2006.01)
*G02F 1/1333* (2006.01)

(52) U.S. Cl.
CPC .... *G02F 1/133707* (2013.01); *G02F 1/13743* (2013.01); *G02F 1/133308* (2013.01); *G02F 1/134345* (2021.01)

(58) Field of Classification Search
CPC .................................................. G02F 1/133707
See application file for complete search history.

(56) References Cited

U.S. PATENT DOCUMENTS

| 2012/0307190 A1 | 12/2012 | Zhang |
| 2015/0138473 A1 | 5/2015 | Zhang |
| 2017/0059949 A1* | 3/2017 | Tsuei ................ G02F 1/133707 |
| 2017/0146866 A1* | 5/2017 | Zhong ................ G02F 1/136286 |

FOREIGN PATENT DOCUMENTS

| CN | 102193256 A | 9/2011 |
| CN | 104914635 A | 9/2015 |
| CN | 106483722 A | 3/2017 |
| JP | 2003315801 A | 11/2003 |

\* cited by examiner

*Primary Examiner* — Sang V Nguyen
(74) *Attorney, Agent, or Firm* — Mark M. Friedman

(57) ABSTRACT

The present disclosure provides a display panel comprising pixel units. Each of the pixel units has one or more first domains and one or more second domains. Each of the pixel units comprises a pixel electrode. The pixel electrode comprises first branches disposed in the one or more first domains at a first angle, and second branches disposed in the one or more second domains at a second angle. Every one or more first branches and every one or more second branches are staggered to form a zigzag structure between every first and second domains.

18 Claims, 4 Drawing Sheets

DISPLAY PANEL

FIELD OF INVENTION

The present disclosure relates to the field of display technology, and particularly to a display panel and a display device

BACKGROUND

A pixel unit of a current display panel comprises a plurality of domains. A linear backbone is disposed between two adjacent domains. First branches and second branches are respectively disposed on two opposite sides of the linear backbone and are symmetrically disposed with respect to the linear backbone. Such an arrangement may cause a large width of dark lines at the linear backbone so that a current display panel has a large width of dark lines, which results in poor display quality.

Summary of Disclosure

The present disclosure provides a display panel to solve the technical problem that a current display panel has a large width of dark lines.

In order to solve the above problem, the present disclosure provides technical solutions as follows.

The present disclosure provides a display panel comprising a base substrate and pixel units arrayed on the base substrate.

Each of the pixel units has one or more first domains and one or more second domains. Each of the pixel units comprises a pixel electrode comprising first branches disposed in the one or more first domains and second branches disposed in the one or more second domains. The first branches are disposed at a first angle. The second branches are disposed at a second angle. Every one or more first branches and every one or more second branches are staggered to form a zigzag structure between every first and second domains.

In the display panel, each of the pixel units has two first domains and two second domains, and the zigzag structure is formed between every first and second domains.

In the display panel, the first angle ranges from 30° to 60°, the second angle ranges from 120° to 150°, and a sum of the first angle and the second angle is 180°.

In the display panel, every two first branches and every two second branches are staggered.

In the display panel, an interval between two adjacent first branches is the same as an interval between two adjacent second branches.

In the display panel, every three first branches and every three second branches are staggered.

In the display panel, intervals between every two adjacent first branches are the same. Intervals between every two adjacent second branches are the same.

In the display panel, an interval between two adjacent first branches is the same as an interval between two adjacent second branches.

In the display panel, the first angle is 45° and the second angle is 135°.

In the display panel, intervals between every two adjacent first branches are different.

The present disclosure further provides a display device comprising a display panel. The display panel comprises a base substrate and pixel units arrayed on the base substrate. Each of the pixel units has one or more first domains and one or more second domains. Each of the pixel units comprises a pixel electrode comprising first branches disposed in the one or more first domains and second branches disposed in the one or more second domains. The first branches are disposed at a first angle. The second branches are disposed at a second angle. Every one or more first branches and every one or more second branches are staggered to form a zigzag structure between every first and second domains.

In the display device, each of the pixel units has two first domains and two second domains, and the zigzag structure is formed between every first and second domains.

In the display device, the first angle ranges from 30° to 60°, the second angle ranges from 120° to 150°, and a sum of the first angle and the second angle is 180°.

In the display device, every two first branches and every two second branches are staggered.

In the display device, an interval between two adjacent first branches is the same as an interval between two adjacent second branches.

In the display device, every three first branches and every three second branches are staggered.

In the display device, intervals between every two adjacent first branches are the same. Intervals between every two adjacent second branches are the same.

In the display device, an interval between two adjacent first branches is the same as an interval between two adjacent second branches.

In the display device, the first angle is 45° and the second angle is 135°.

In the display device, intervals between every two adjacent first branches are different.

The present disclosure provides a display panel comprising a base substrate and pixel units arrayed on the base substrate. Each of the pixel units has one or more first domains and one or more second domains. Each of the pixel units comprises a pixel electrode comprising first branches disposed in the one or more first domains and second branches disposed in the one or more second domains. The first branches are disposed at a first angle. The second branches are disposed at a second angle. Every one or more first branches and every one or more second branches are staggered to form a zigzag structure between every first and second domains. The zigzag structure formed by staggering the first branches and the second branches reduces dark lines.

BRIEF DESCRIPTION OF DRAWINGS

In order to more clearly illustrate the technical solutions in the embodiments of the present disclosure, a brief description of accompanying drawings used in the description of the embodiments of the present disclosure will be given below. Obviously, the accompanying drawings in the following description are merely some embodiments of the present disclosure. For those skilled in the art, other drawings may be obtained from these accompanying drawings without creative labor.

DETAILED DESCRIPTION

Figure 1:
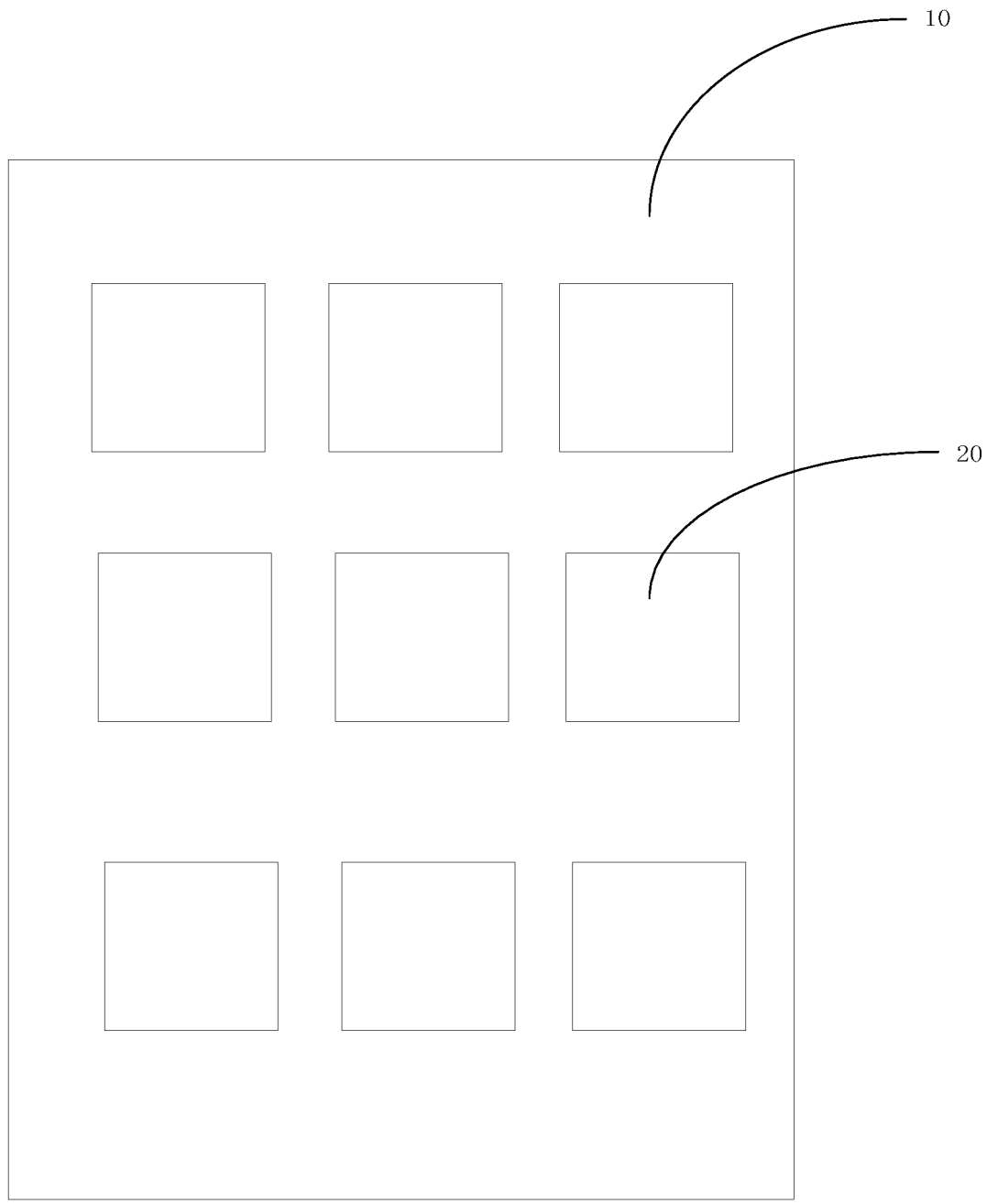
FIG. 1 is a schematic diagram of a display panel according to an embodiment of the present disclosure.

The following description of various embodiments of the present disclosure with reference to the accompanying drawings is used to illustrate specific embodiments that can be practiced. Directional terms mentioned in the present disclosure, such as "above", "below", "front", "back", "left", "right", "inside", "outside", "side", are merely used to indicate the direction of the accompanying drawings. Therefore, the directional terms are used for illustrating and understanding the present disclosure rather than limiting the present disclosure. In the figures, elements with similar structure are indicated by the same reference numerals.

Embodiments of the present disclosure can solve the technical problem that a current display panel has a large width of dark lines.

Figure 2:
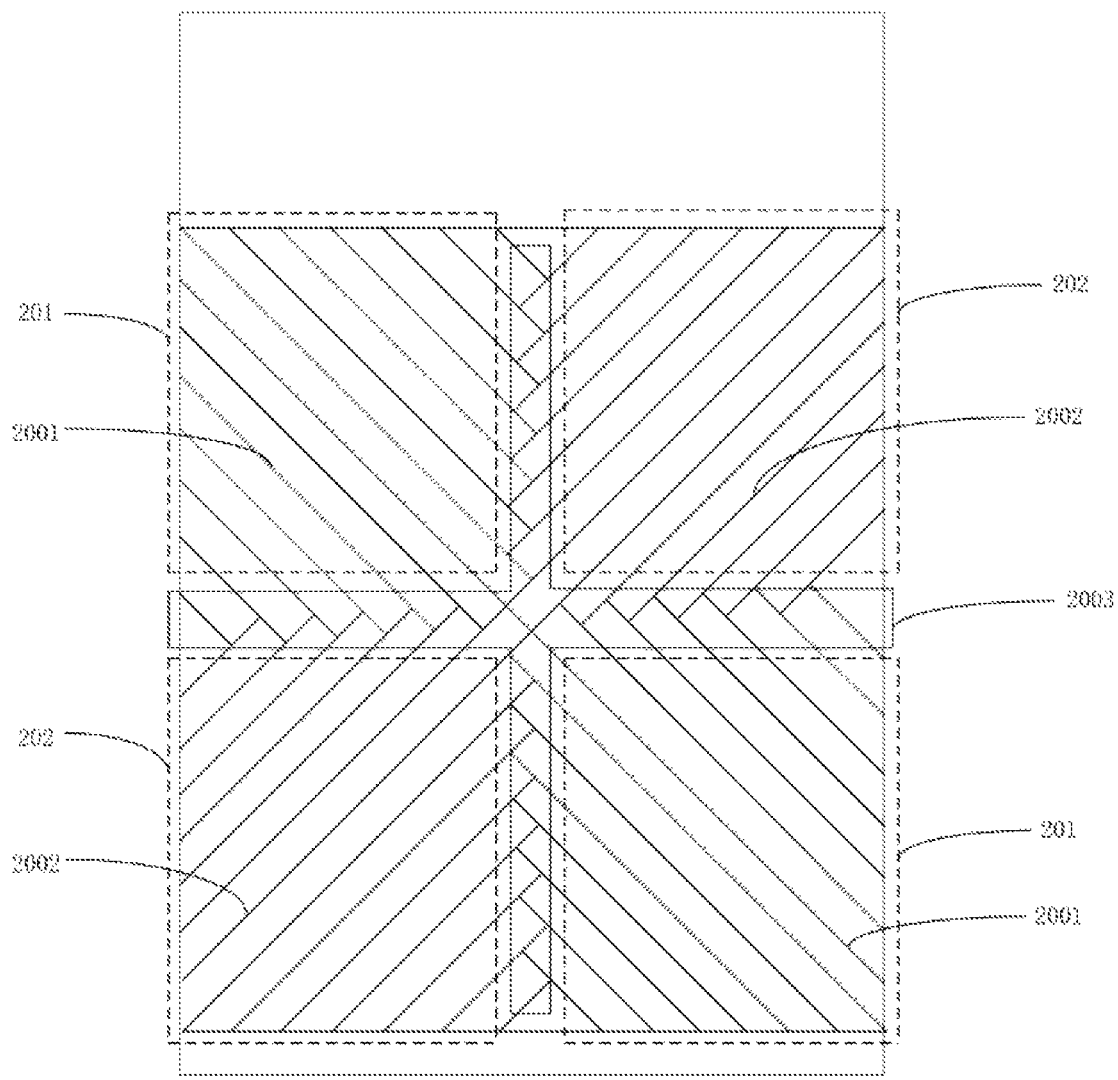
FIG. 2 is a first schematic diagram of a pixel unit of a display panel according to an embodiment of the present disclosure.

As shown in FIG. 1 and FIG. 2, the present disclosure provides a display panel comprising a base substrate 10 and pixel units 20 arrayed on the base substrate 10. Each of the pixel units 20 has one or more first domains 201 and one or more second domains 202. Each of the pixel units 20 comprises a pixel electrode comprising first branches 2001 disposed in the one or more first domains 201 and second branches 2002 disposed in the one or more second domains 202. The first branches 2001 are disposed at a first angle. The second branches 2002 are disposed at a second angle. Every one or more first branches 2001 and every one or more second branches 2002 are staggered to form a zigzag structure 2003 between every first and second domains 201 and 202.

In this embodiment, the display panel comprises a base substrate 10 and pixel units 20 arrayed on the base substrate 10. Each of the pixel units 20 has one or more first domains 201 and one or more second domains 202. Each of the pixel units 20 comprises a pixel electrode comprising first branches 2001 disposed in the one or more first domains 201 and second branches 2002 disposed in the one or more second domains 202. The first branches 2001 are disposed at a first angle. The second branches 2002 are disposed at a second angle. Every one or more first branches 2001 and every one or more second branches 2002 are staggered to form a zigzag structure 2003 between every first and second domains 201 and 202. By staggering the first branches 2001 and the second branches 2002, the zigzag structure 2003 is formed between every first and second domains 201 and 202 to reduces dark lines.

In an embodiment, each of the pixel units 20 has two first domains 201 and two second domains 202, and the zigzag structure 2003 is formed between every first and second domains 201 and 202.

In an embodiment, the first angle ranges from 30° to 60°, the second angle ranges from 120° to 150°, and a sum of the first angle and the second angle is 180°.

For example, in an embodiment, the first angle is 45° and the second angle is 135°.

In an embodiment, as shown in FIG. 2, every first branch 2001 and every second branch 2002 are staggered.

In an embodiment, a width of the first branches 2001 is greater than a width of the second branches 2002.

In an embodiment, a width of the first branches 2001 is equal to a width of the second branches 2002.

In an embodiment, the sum of the first angle and the second angle is not equal to 180°.

Figure 3:
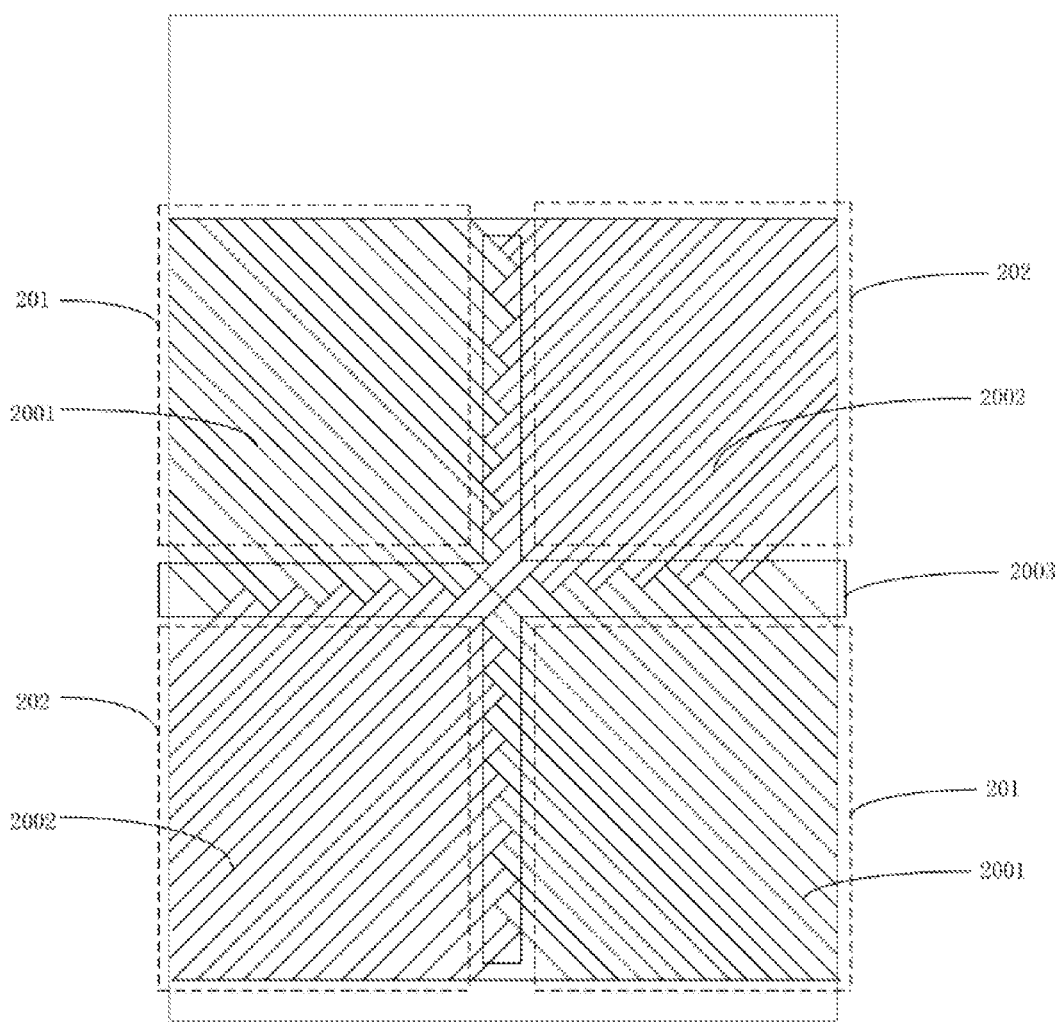
FIG. 3 is a second schematic diagram of a pixel unit of a display panel according to an embodiment of the present disclosure.

In an embodiment, as shown in FIG. 3, every two first branches and every two second branches are staggered.

In an embodiment, an interval between two adjacent first branches differs from an interval between two adjacent second branches.

In an embodiment, the sum of the first angle and the second angle is less than 180°.

In an embodiment, the sum of the first angle and the second angle is greater than 180°.

In an embodiment, a width of the first branches 2001 is equal to a width of the second branches 2002.

In a aspect of reducing dark lines, this embodiment is better than a normal pixel electrode and a pixel electrode formed by staggering every three first branches 2001 and every three second branches 2002.

In an embodiment, an interval between two adjacent first branches 2001 is the same as an interval between two adjacent second branches 2002.

In an embodiment, an interval between two adjacent first branches 2001 is less than a width of the first branches 2001.

In this embodiment, due to influence of a designed turning point, waves are obvious, which is not conducive to stability, and the penetration rate is enhanced due to increase of actual paths of dark lines.

In an embodiment, intervals between every two adjacent first branches 2001 are the same. Intervals between every two adjacent second branches 2002 are the same.

In an embodiment, an interval between two adjacent first branches 2001 is the same as an interval between two adjacent second branches 2002.

In an embodiment, the first angle is 45° and the second angle is 135°.

In an embodiment, intervals between every two adjacent first branches 2001 are different.

In an embodiment, an interval between two adjacent first branches differs from an interval between two adjacent second branches.

The present disclosure further provides a display device comprising a display panel. The display panel comprises a base substrate 10 and pixel units 20 arrayed on the base substrate 10. Each of the pixel units 20 has one or more first domains 201 and one or more second domains 202. Each of the pixel units 20 comprises a pixel electrode comprising first branches 2001 disposed in the one or more first domains 201 and second branches 2002 disposed in the one or more second domains 202. The first branches 2001 are disposed at a first angle. The second branches 2002 are disposed at a second angle. Every one or more first branches 2001 and every one or more second branches 2002 are staggered to form a zigzag structure 2003 between every first and second domains 201 and 202.

In this embodiment, the display device comprises a display panel. The display panel comprises a base substrate 10 and pixel units 20 arrayed on the base substrate 10. Each of the pixel units 20 has one or more first domains 201 and one or more second domains 202. Each of the pixel units 20 comprises a pixel electrode comprising first branches 2001 disposed in the one or more first domains 201 and second branches 2002 disposed in the one or more second domains 202. The first branches 2001 are disposed at a first angle. The second branches 2002 are disposed at a second angle. Every one or more first branches 2001 and every one or more second branches 2002 are staggered to form a zigzag structure 2003 between every first and second domains 201 and 202. By staggering the first branches 2001 and the second branches 2002, the zigzag structure 2003 is formed between every first and second domains 201 and 202 to reduces dark lines.

In an embodiment, each of the pixel units 20 has two first domains 201 and two second domains 202, and the zigzag structure 2003 is formed between every first and second domains 201 and 202.

In an embodiment, the first angle ranges from 30° to 60°, the second angle ranges from 120° to 150°, and a sum of the first angle and the second angle is 180°.

For example, in an embodiment, the first angle is 45° and the second angle is 135°.

In an embodiment, as shown in FIG. 2, every first branch 2001 and every second branch 2002 are staggered.

In an embodiment, a width of the first branches 2001 is greater than a width of the second branches 2002.

In an embodiment, a width of the first branches 2001 is equal to a width of the second branches 2002.

In an embodiment, the sum of the first angle and the second angle is not equal to 180°.

In an embodiment, as shown in FIG. 3, every two first branches and every two second branches are staggered.

In an embodiment, an interval between two adjacent first branches differs from an interval between two adjacent second branches.

In an embodiment, the sum of the first angle and the second angle is less than 180°.

In an embodiment, the sum of the first angle and the second angle is greater than 180°.

In an embodiment, a width of the first branches 2001 is equal to a width of the second branches 2002.

In an embodiment, an interval between two adjacent first branches 2001 is the same as an interval between two adjacent second branches 2002.

In an embodiment, an interval between two adjacent first branches 2001 is less than a width of the first branches 2001.

Figure 4:
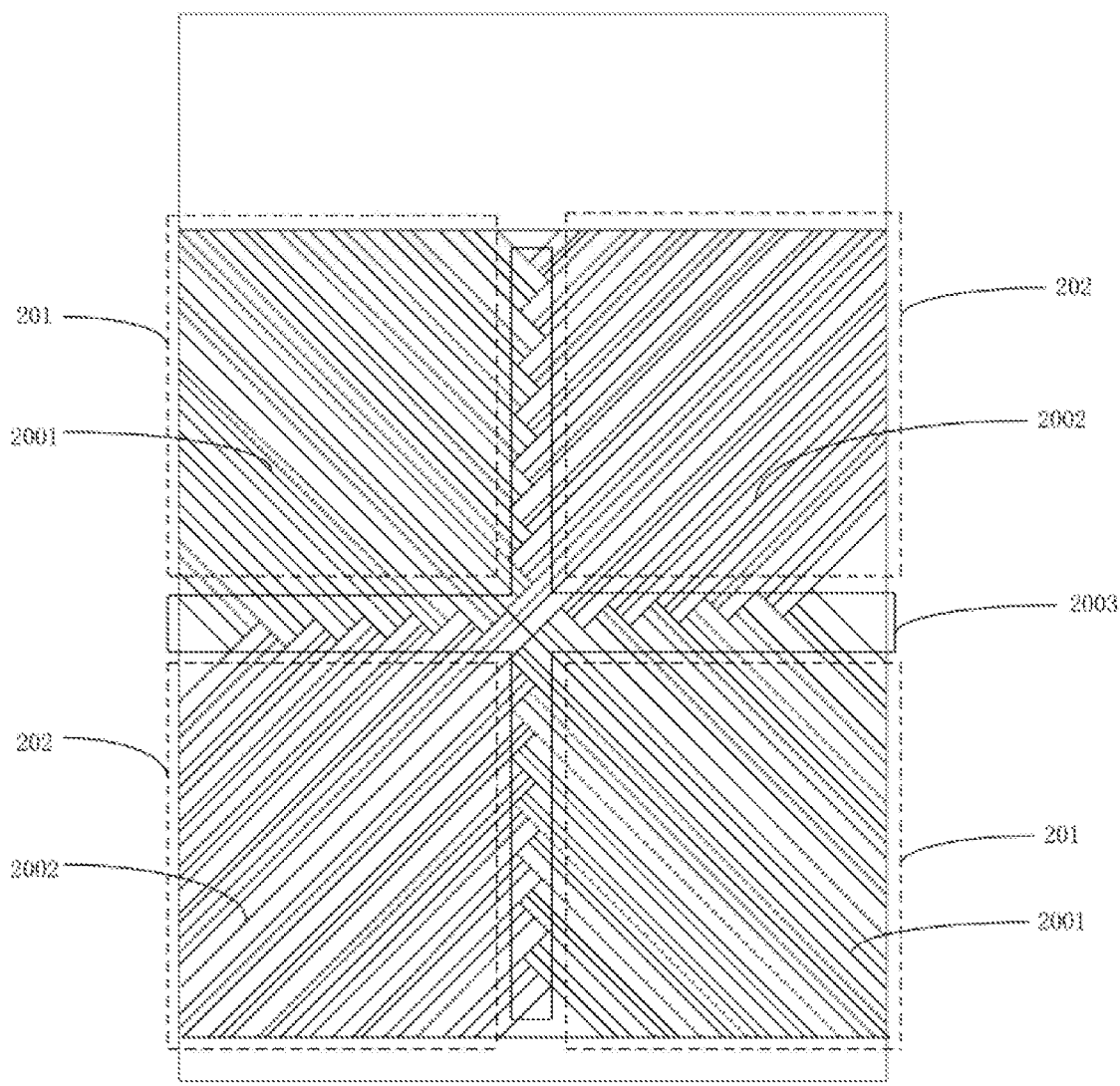
FIG. 4 is a third schematic diagram of a pixel unit of a display panel according to an embodiment of the present disclosure.

In an embodiment, as shown in FIG. 4, every three first branches 2001 and every three second branches 2002 are staggered.

In an embodiment, intervals between every two adjacent first branches 2001 are the same. Intervals between every two adjacent second branches 2002 are the same.

In an embodiment, an interval between two adjacent first branches 2001 is the same as an interval between two adjacent second branches 2002.

In an embodiment, the first angle is 45° and the second angle is 135°.

In an embodiment, intervals between every two adjacent first branches 2001 are different.

In an embodiment, an interval between two adjacent first branches differs from an interval between two adjacent second branches.

Between two adjacent domains, a new boundary with a zigzag structure 2003 is formed by staggering the first branches 2001 and the second branches 2002 of the pixel electrode.

It can be known from optical simulation results that a electric field of the new boundary with the zigzag structure 2003 is beneficial to alignment and convergence of liquid crystal molecules, reducing dark lines, and improving transmittance.

The present disclosure provides a display panel comprising a base substrate and pixel units arrayed on the base substrate. Each of the pixel units has one or more first domains and one or more second domains. Each of the pixel units comprises a pixel electrode comprising first branches disposed in the one or more first domains and second branches disposed in the one or more second domains. The first branches are disposed at a first angle. The second branches are disposed at a second angle. Every one or more first branches and every one or more second branches are staggered to form a zigzag structure between every first and second domains. The zigzag structure formed by staggering the first branches and the second branches reduces dark lines and improves transmittance.

In the above, the present application has been described in the above preferred embodiments, but the preferred embodiments are not intended to limit the scope of the present application, and those skilled in the art may make various modifications without departing from the scope of the present application. The scope of the present application is determined by claims.

What is claimed is:

1. A display panel, comprising a base substrate and pixel units arrayed on the base substrate, wherein each of the pixel units has one or more first domains and one or more second domains, each of the pixel units comprises a pixel electrode comprising first branches disposed in the one or more first domains and second branches disposed in the one or more second domains, every one or more first branches and every one or more second branches are staggered to form a zigzag structure between every first and second domains, a width of the first branches is greater than a width of the second branches, the first branches are disposed at a first angle in reference to an extending direction of the zigzag structure, the second branches are disposed at a second angle in reference to the extending direction of the zigzag structure, the first angle ranges from 30° to 60°, the second angle ranges from 120° to 150°, and a sum of the first angle and the second angle is not equal to 180°.

2. The display panel according to claim 1, wherein every two first branches and every two second branches are staggered.

3. The display panel according to claim 2, wherein an interval between two adjacent first branches differs from an interval between two adjacent second branches.

4. The display panel according to claim 2, wherein an interval between two adjacent first branches is less than a width of the first branches.

5. The display panel according to claim 1, wherein every three first branches and every three second branches are staggered.

6. The display panel according to claim 5, wherein intervals between every two adjacent first branches are the same, and intervals between every two adjacent second branches are the same.

7. The display panel according to claim 6, wherein an interval between two adjacent first branches is the same as an interval between two adjacent second branches.

8. The display panel according to claim 6, wherein an interval between two adjacent first branches differs from an interval between two adjacent second branches.

9. The display panel according to claim 5, wherein intervals between every two adjacent first branches are different.

10. A display panel, comprising a base substrate and pixel units arrayed on the base substrate, each of the pixel units has one or more first domains and one or more second domains, each of the pixel units comprises a pixel electrode comprising first branches disposed in the one or more first domains and second branches disposed in the one or more second domains, every one or more first branches and every one or more second branches are staggered to form a zigzag structure between every first and second domains, a width of the first branches is greater than a width of the second branches, the first branches are disposed at a first angle in reference to an extending direction of the zigzag structure, the second branches are disposed at a second angle in reference to the extending direction of the zigzag structure, the first angle ranges from 30° to 60°, the second angle ranges from 120° to 150°, and a sum of the first angle and the second angle is not equal to 180°.

11. The display panel according to claim 10, wherein every two first branches and every two second branches are staggered.

12. The display panel according to claim 11, wherein an interval between two adjacent first branches differs from an interval between two adjacent second branches.

13. The display panel according to claim 11, wherein an interval between two adjacent first branches is less than a width of the first branches.

14. The display panel according to claim 10, wherein every three first branches and every three second branches are staggered.

15. The display panel according to claim 14, wherein intervals between every two adjacent first branches are the same, and intervals between every two adjacent second branches are the same.

16. The display panel according to claim 15, wherein an interval between two adjacent first branches is the same as an interval between two adjacent second branches.

17. The display panel according to claim 15, wherein an interval between two adjacent first branches differs from an interval between two adjacent second branches.

18. The display panel according to claim 14, wherein intervals between every two adjacent first branches are different.

* * * * *